(12) United States Patent
Shahparnia et al.

(10) Patent No.: US 10,459,546 B2
(45) Date of Patent: Oct. 29, 2019

(54) CHANNEL AGGREGATION FOR OPTIMAL STYLUS DETECTION

(71) Applicant: Apple Inc., Cupertino, CA (US)

(72) Inventors: Shahrooz Shahparnia, Campbell, CA (US); Kevin J. White, Los Gatos, CA (US); Manu Agarwal, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 528 days.

(21) Appl. No.: 13/830,127

(22) Filed: Mar. 14, 2013

(65) Prior Publication Data

US 2014/0267070 A1   Sep. 18, 2014

(51) Int. Cl.
G06F 3/041 (2006.01)
G06F 3/046 (2006.01)
G06F 3/0354 (2013.01)

(52) U.S. Cl.
CPC .......... *G06F 3/041* (2013.01); *G06F 3/03545* (2013.01); *G06F 3/046* (2013.01)

(58) Field of Classification Search
USPC .......................................... 178/18.01–20.04
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,543,590 A | 8/1996 | Gillespie et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |

(Continued)

FOREIGN PATENT DOCUMENTS

| | | |
|---|---|---|
| EP | 2 264 576 A1 | 12/2010 |
| EP | 2 343 631 A1 | 7/2011 |

(Continued)

OTHER PUBLICATIONS

Non-Final Office Action dated Oct. 8, 2014, for U.S. Appl. No. 13/908,936, filed Jun. 3, 2013, seven pages.

(Continued)

*Primary Examiner* — Stephen T. Reed
(74) *Attorney, Agent, or Firm* — Kubota & Basol LLP

(57) ABSTRACT

A touch input device configured to detect stylus signals generated by an external stylus is provided. The touch input device includes a plurality of stylus signal detectors that receive at its input a combination of stylus receive channels that are combined in a manner to minimize noise while at the same time keeping the stylus signal strength uniform independent of the position of the stylus on the device.

24 Claims, 24 Drawing Sheets

(56) References Cited

U.S. PATENT DOCUMENTS

| | | |
|---|---|---|
| 8,479,122 B2 | 7/2013 | Hotelling et al. |
| 8,816,988 B2 | 8/2014 | Chan et al. |
| 2004/0095333 A1 | 5/2004 | Morag et al. |
| 2006/0026521 A1 | 2/2006 | Hotelling et al. |
| 2006/0197753 A1 | 9/2006 | Hotelling |
| 2008/0062148 A1 | 3/2008 | Hotelling et al. |
| 2008/0243994 A1 | 10/2008 | Kropivny |
| 2010/0108410 A1 | 5/2010 | Yeh |
| 2010/0155153 A1* | 6/2010 | Zachut ............... G06F 3/03545 178/18.03 |
| 2010/0321315 A1* | 12/2010 | Oda et al. .................... 345/173 |
| 2011/0025634 A1* | 2/2011 | Krah ..................... G06F 3/0412 345/173 |
| 2011/0205244 A1 | 8/2011 | Myers |
| 2012/0013555 A1 | 1/2012 | Maeda et al. |
| 2012/0212441 A1* | 8/2012 | Christiansson et al. ...... 345/173 |
| 2013/0050101 A1 | 2/2013 | Lu |
| 2013/0050116 A1 | 2/2013 | Shin et al. |
| 2013/0069894 A1 | 3/2013 | Chen et al. |
| 2013/0093722 A1 | 4/2013 | Nogiuchi et al. |
| 2014/0028577 A1 | 1/2014 | Krah et al. |
| 2014/0071082 A1* | 3/2014 | Singh et al. .................. 345/174 |
| 2014/0267071 A1 | 9/2014 | Shahparnia |
| 2014/0354555 A1 | 12/2014 | Shahparnia et al. |

FOREIGN PATENT DOCUMENTS

| | | |
|---|---|---|
| JP | 2000-163031 A | 6/2000 |
| JP | 2002-342033 A | 11/2002 |
| TW | 201229835 A | 7/2012 |
| TW | 201310304 A | 3/2013 |
| WO | WO-2014/158748 A1 | 10/2014 |
| WO | WO-2014/160316 A2 | 10/2014 |
| WO | WO-2014/197163 A1 | 12/2014 |

OTHER PUBLICATIONS

International Search Report dated Nov. 12, 2014, for PCT Application No. PCT/US2014/037376, filed May 8, 2014, seven pages.

International Search Report dated Jun. 27, 2014, for PCT Application No. PCT/US2014/019822, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Apr. 2, 2015, for U.S. Appl. No. 13/830,399, filed Mar. 14, 2013, eight pages.

Non-Final Office Action dated Apr. 9, 2015, for U.S. Appl. No. 13/908,936, filed Jun. 3, 2013, seven pages.

Search Report dated May 26, 2015 for ROC (Taiwan) Patent Application No. 103118140, filed May 23, 2014, with English translation, two pages.

Final Office Action dated Oct. 7, 2015, for U.S. Appl. No. 13/830,399, filed Mar. 14, 2013, twelve pages.

Final Office Action dated Feb. 22, 2016, for U.S. Appl. No. 13/908,936, filed Jun. 3, 2013, twelve pages.

Non-Final Office Action dated Jun. 23, 2016, for U.S. Appl. No. 13/830,399, filed Mar. 14, 2013, nine pages.

\* cited by examiner

| Column Number | Detector i Input | Detector i+1 Input | Detector i+2 Input | Detector i+3 Input | Detector i+4 Input |
|---|---|---|---|---|---|
| C(i) | + | 1108 | | | |
| C(i+1) | 1106 | + | | | |
| C(i+2) | | | + | | |
| C(i+3) | | | | + | |
| C(i+4) | | | | | + |

| Column Number | Detector i Input | Detector i+1 Input | Detector i+2 Input | Detector i+3 Input | Detector i+4 Input | Detector i+5 Input | Detector i+6 Input |
|---|---|---|---|---|---|---|---|
| C(i) | + | | | | | | |
| C(i+1) | + | + | | | | | |
| C(i+2) | | + | + | | | | |
| C(i+3) | | | + | + | | | |
| C(i+4) | | | | + | + | | |
| C(i+5) | | | | | + | + | |
| C(i+6) | | | | | | + | + |
| C(i+7) | | | | | | | + |

FIG. 12B

| Column Number | Detector i Input | Detector i+1 Input | Detector i+2 Input | Detector i+3 Input | Detector i+4 Input | Detector i+5 Input |
|---|---|---|---|---|---|---|
| C(i) | - | | | | | |
| C(i+1) | + | - | | | | |
| C(i+2) | | + | - | | | |
| C(i+3) | | | + | - | | |
| C(i+4) | | | | + | - | |
| C(i+5) | | | | | + | - |
| C(i+6) | | | | | | + |
| C(i+7) | | | | | | |

FIG. 13B

| Column Number | Detector i Input | Detector i+1 Input | Detector i+2 Input | Detector i+3 Input | Detector i+4 Input | Edge Detector | Edge Detector |
|---|---|---|---|---|---|---|---|
| C(i) | - | | | | | | |
| C(i+1) | + | - | | | | + | |
| C(i+2) | + | + | - | | | + | |
| C(i+3) | - | + | + | - | | - | |
| C(i+4) | | - | + | + | - | - | |
| C(i+5) | | | - | + | + | | - |
| C(i+6) | | | | - | + | | + |
| C(i+7) | | | | | - | | + |

FIG. 14

| Column Number | Detector i Input | Detector i+1 Input | Detector i+2 Input | Detector i+3 Input |
|---|---|---|---|---|
| C(i) | − | | | |
| C(i+1) | | − | | |
| C(i+2) | + | | | |
| C(i+3) | | + | | |
| C(i+4) | | | − | |
| C(i+5) | | | | − |
| C(i+6) | | | + | |
| C(i+7) | | | | + |

FIG. 15B

| Column Number | Detector 1 Input | Detector 2 Input |
|---|---|---|
| C(i) | - | + |
| C(i+1) | - | - |
| C(i+2) | + | - |
| C(i+3) | + | + |
| C(i+4) | - | + |
| C(i+5) | - | - |
| C(i+6) | + | - |
| C(i+7) | + | + |
| C(i+8) | - | + |
| C(i+9) | - | - |
| C(i+10) | + | - |
| C(i+11) | + | + |

FIG. 16

| Column Number | Detector 1 Input | Detector 2 Input | Detector 3 Input | Detector 4 Input |
|---|---|---|---|---|
| C(i) | - | + | | |
| C(i+1) | - | - | | |
| C(i+2) | + | - | | |
| C(i+3) | + | + | | |
| C(i+4) | - | + | | |
| C(i+5) | - | - | | |
| C(i+6) | | | + | - |
| C(i+7) | | | + | + |
| C(i+8) | | | - | + |
| C(i+9) | | | - | - |
| C(i+10) | | | + | - |
| C(i+11) | | | + | + |

FIG. 17

CHANNEL AGGREGATION FOR OPTIMAL STYLUS DETECTION

FIELD

This relates generally to touch sensitive devices and, more specifically, to touch sensitive devices which can also accept input from a stylus.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. Most conventional styli simply include a bulky tip made of a material capable of interacting with the touch sensitive device and resembling a user's finger. As a result, conventional styli lack the precision and control of traditional writing instruments. A stylus capable of receiving stimulation and force signals and generating stylus stimulation signals that can be transmitted to the touch sensitive device can improve the precision and control of the stylus. However, such a stylus can present demodulation challenges to the touch sensitive device due to the asynchronous interaction between the stylus and the device.

SUMMARY

A stylus signal detection technique and apparatus that can facilitate synchronous demodulation on a touch input device is disclosed.

In one example, a stylus signal can be detected and the detector can estimate the start and end time of the stylus signal. The estimated start and end time of the stylus signal can then be used to generate a window to be used by a digital demodulator to effectively and efficiently demodulate the stylus signal.

BRIEF DESCRIPTION OF THE DRAWINGS

FIG. 11a illustrates an example stylus detector aggregation scheme according to examples of the disclosure.

FIG. 11b illustrates a corresponding detector chart to the aggregation scheme of FIG. 11a.

FIG. 12b illustrates the corresponding detector chart of FIG. 12a according to examples of the disclosure.

FIG. 13b illustrates a detector chart corresponding to the example of FIG. 13a according to examples of the disclosure FIG. 14 illustrates an exemplary detector chart of a stylus detector aggregation scheme according to examples of the disclosure.

FIG. 15b illustrates a corresponding detector chart to the aggregation schemed depicted in FIG. 15a according to examples of the disclosure.

FIG. 16 illustrates an aggregation scheme that uses only two detectors according to examples of the disclosure.

FIG. 17 illustrates an exemplary aggregation scheme according to examples of the disclosure.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to synchronizing a detected stylus signal with a windowing function in order to facilitate efficient demodulation of a stylus. In one example, a stylus signal can be processed by a detector which can detect an end point of a stylus signal in the time domain, and based on the end point can estimate the beginning of the stylus signal. After obtaining the start and end times of a stylus signal, the demodulator can then synchronize the signal to an appropriately sized windowed demodulation scheme in order to achieve efficient demodulation of the stylus signal on a touch sensor panel.

In some examples, the detectors used to determine the beginning and end of a stylus signal can be aggregated in various architectures throughout the touch sensor panel in order to efficiently detect stylus signals while at the same time providing a robust detection scheme that protects against common mode noise.

Figure 1:
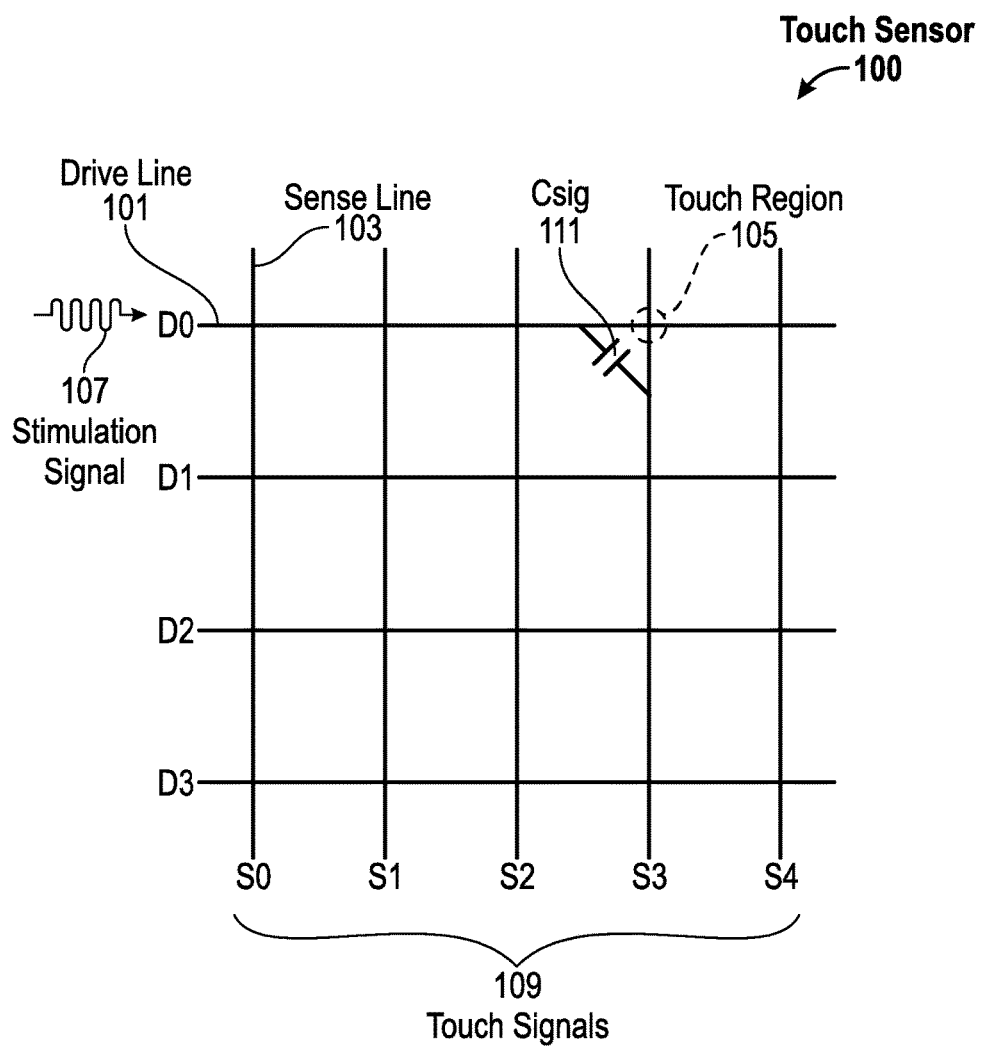
FIG. 1 illustrates an exemplary touch sensor that can be used with a touch sensitive device according to various examples.

FIG. 1 illustrates touch sensor 100 that can be used to detect touch events on a touch sensitive device, such as a mobile phone, tablet, touchpad, portable computer, portable media player, or the like. Touch sensor 100 can include an array of touch regions or nodes 105 that can be formed at the crossing points between rows of drive lines 101 (D0-D3) and columns of sense lines 103 (S0-S4). Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can receive touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a passive stylus, finger, etc., touches the touch sensor 100, the object can cause the capacitance Csig 111 to reduce by an amount ΔCsig at the touch location. This capacitance change ΔCsig can be caused by charge or current from the stimulated drive line 101 being shunted through the touching object to ground rather than being coupled to the crossing sense line 103 at the touch location. The touch signals 109 representative of the capacitance change ΔCsig can be received by the sense lines 103 to the sense circuitry for processing. The touch signals 109 can indicate the touch region where the touch occurred and the amount of touch that occurred at that touch region location.

While the example shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

Figure 2:
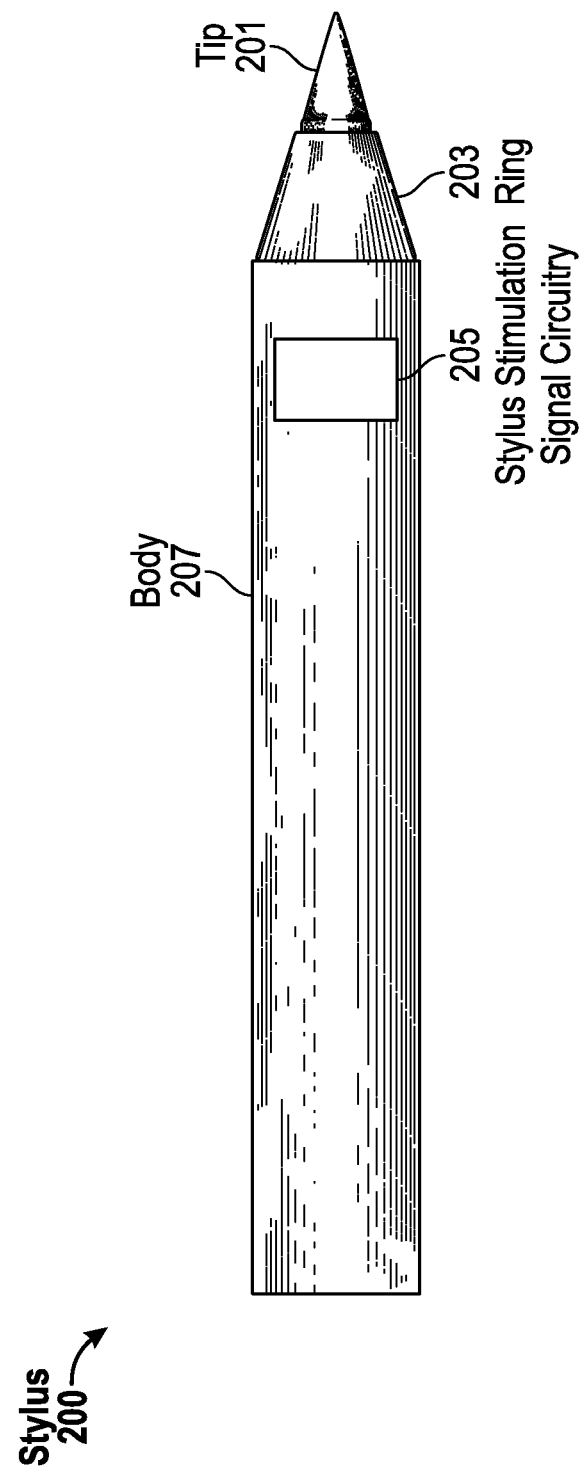
FIG. 2 illustrates a block diagram of an exemplary stylus according to various examples.

FIG. 2 illustrates a block diagram of an exemplary stylus 200 that can be used with a touch sensitive device, such as a mobile phone, touchpad, portable computer, or the like. Stylus 200 can generally include tip 201, ring 203, body 207, and multiple stylus stimulation signal circuitry 205 located within body 207. As will be described in greater detail below, stylus stimulation signal circuitry 205 can be used to generate a stimulation signal that can be transmitted to a touch sensitive device through tip 201. Tip 201 can include a material capable of transmitting the stylus stimulation signal from stylus stimulation signal circuitry 205 to the touch sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, tip 201 can have a diameter of about 1.5 mm or less. Tip 201, used to transmit stimulus signals from the stylus can be implemented using ring 203. Ring 203 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like. Ring 203 can serve other purposes, such as providing an alternative means for transmitting the stylus stimulation signal from the stylus to the touch sensitive device. Similarly, tip 201 or ring 203 can also be used to sense the touch drive signal from the touch sensitive device. Both tip 201 and ring 203 can be segmented and each segment can be independently controlled according to the description above.

Figure 3:
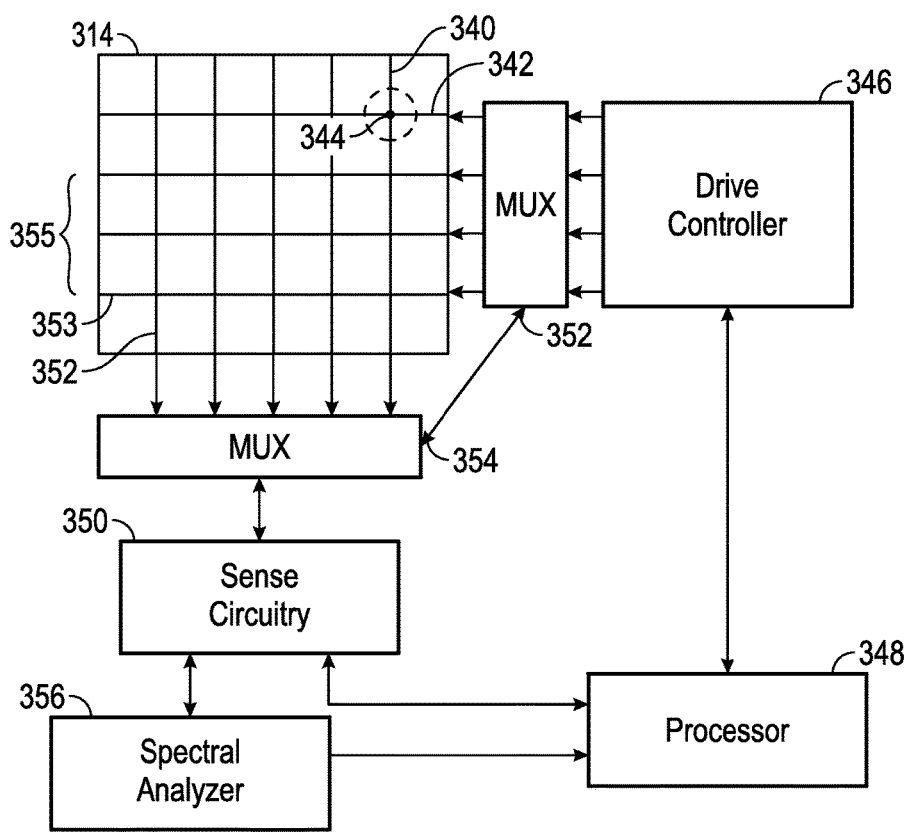
FIG. 3 illustrates a control system for a touch sensor that can detect both a user's touch and signals from a stylus according to disclosed examples.

FIG. 3 illustrates a control system for a touch sensor that can detect both a user's touch or proximity and signals from a stylus according to disclosed examples. The sensor panel 314 of the touch sensor may be configured to detect touches on, or hovering over, the surface of the touch screen by changes in capacitance as described above in reference to FIG. 1. With reference to FIG. 3, a sensing node 344 formed by one or more electrodes (explained below) may form a first electrically conductive member and an object, such as a finger of the user, may form a second electrically conductive member. The sensor panel 314 of the touch screen may be configured as in a self-capacitance arrangement or in a mutual capacitance arrangement.

In the self-capacitance arrangement, electrodes may include a single layer of a plurality of electrodes spaced in a grid or other arrangement where each electrode may form a node 344. The sensing circuit 350 can monitor changes in capacitance that may occur at each node 344. These changes can typically occur at a node 344 when a user places an object (e.g., finger or tip 201 of the stylus 200) in close proximity to the electrode.

With continued reference to FIG. 3, in a mutual capacitance system, the electrodes may be separated into two layers forming drive lines 342 and sense lines 340. The drive lines 342 may be formed on a first layer and the sense lines 340 may be formed on a second layer. The nodes 344 for the sensor panel 314 may be defined at locations where the drive lines 342 may cross over or under the sense lines 340 (although they are typically placed in different layers). The sense lines 340 may intersect the drive lines 342 in a variety of manners. For example, in one example, the sense lines 340 can be perpendicular to the drive lines 342, thus forming nodes 344 with x and y coordinates. However, other coordinate systems can also be used, and the coordinates of the nodes 344 may be differently defined.

A drive controller 346 can be connected to each of the drive lines 342. The drive controller 346 can provide a stimulation signal (e.g., voltage) to the drive lines 342. The sensing circuit 350 can be connected to each of the sense lines 340 and the sensing circuit 350 can act to detect changes in capacitance at the nodes 344 in the same manner as described in FIG. 1. During operation, the stimulation signal can be applied to the drive lines 342 and due to the capacitive coupling between the drive lines 342 and sensing rows 340, a current can be carried through to the sense lines 340 at each of the nodes 344. The sensing circuit 350 can then monitor changes in capacitance at each of the nodes 344. In some examples each drive line can be switchably configured to operate as sense lines, and thus a sensing circuit and multiplexer similar to 350 and 354 can be connected to the drive lines similar to the sense lines depicted in FIG. 3.

In either the self-capacitance or mutual capacitance arrangements discussed above, the sensing circuit 350 can detect changes in capacitance at each node 344. This may allow the sensing circuit 350 to determine when and where a user has touched various surfaces of the touch screen 306 with one or more objects, or has come in close proximity to the various surfaces of the touch screen. The sensing circuit 350 may include one more sensors for each of the sense lines 340 and may then communicate data to a processor 348. In one example, the sensing circuit 350 may convert the analog capacitive signals to digital data and then transmit the digital data to the processor 348. In other examples, the sensing circuit 350 may transmit the analog capacitance signals to the processor 348, which may then convert the data to a digital form. Further, it should be noted that the sensing circuit 350 may include individual sensors for each sensing line 342 or a single sensor for all of the sense lines 340. The sensing circuit 350 may report a location of the node 344, as well as the intensity of the capacitance (or changed thereof) at the node 344.

In some examples, the touch screen may include one or more multiplexers. For example, during touch or proximity operation, the sensing circuit 350 may also include a multiplexer configured to perform time multiplexing for the sense lines 340. For example, the sensing circuit 350 may receive signals from each of the nodes 344 along the sense lines 340 at approximately the same time, the multiplexer stores the incoming signals and then may release the signals sequentially to the processor 348 one at a time. As discussed above in some examples that are not pictured, the drive lines can be configured to also act as sense lines and thus can be configured with multiplexers and sense circuitry similar to the sense lines as described above.

In addition to the multiplexers that may be used to during a touch mode to process touch signals, the touch screen may also include a drive multiplexer 352 and/or a sense multiplexer 354. These two input device multiplexers 352, 354 may be in communication with the respective set of lines 342, 344 to switch between a touch mode and a stylus or input device mode. As will be discussed in more detail below, during a stylus mode, in which the sensing circuit 350 is configured to detect input from a stylus or other input device, the touch screen may selectively scan the sense lines 340, as well as the drive lines 342, in order to receive data transmitted from the tip 202 of the stylus 200. In these examples, the drive controller 346 may further be configured to sense for signals on the drive lines 342 in order to detect a signal transmitted from the tip 202 of the stylus 200. In this manner, the drive lines 342 may be configured to act as sense lines 340 and interact with the tip 202 of the stylus 200 to receive one or more signals (e.g., voltage signals). In other words, rather than providing a stimulation signal to the drive lines 342, during a stylus scan, if the stylus is transmitting, the stylus may apply a stimulation signal to the drive lines 342 (in the form of a data transmission signal).

In some examples, the drive lines 342 may be scanned after the input device has been detected by the sense lines. These examples may reduce the scanning time required for the touch screen to detect the input device, as the drive lines 342 may only be scanned in instances where the input device is actually present. Thus, if the input device is not detected, the touch screen may more quickly return to scanning for touch inputs. That said, it should be noted that when driving, the stylus 200 may provide a stimulation signal to both the sense and drive lines simultaneously and so in some instances both lines may be scanned simultaneously. However, in some examples, the sense lines 340 and drive lines 342 are scanned and demodulated sequentially (when the input device is detected) as this type of scanning may allow the touch screen to re-use the same touch hardware for both scanning and drive line scanning. That is, the sense circuitry may be multiplexed to the drive lines, to reduce the separate components that may be required by the touch screen.

Additionally, in some examples, the touch controller, such as the sense circuitry 350 and/or drive controller may analyze the input or stimulation signal transmitted from the input device in order to detect the position of the input device, as well as to receive data communication. In other words, the input signal may be used to detect location, and the same signal may be encoded with data from the input device.

Figure 4:
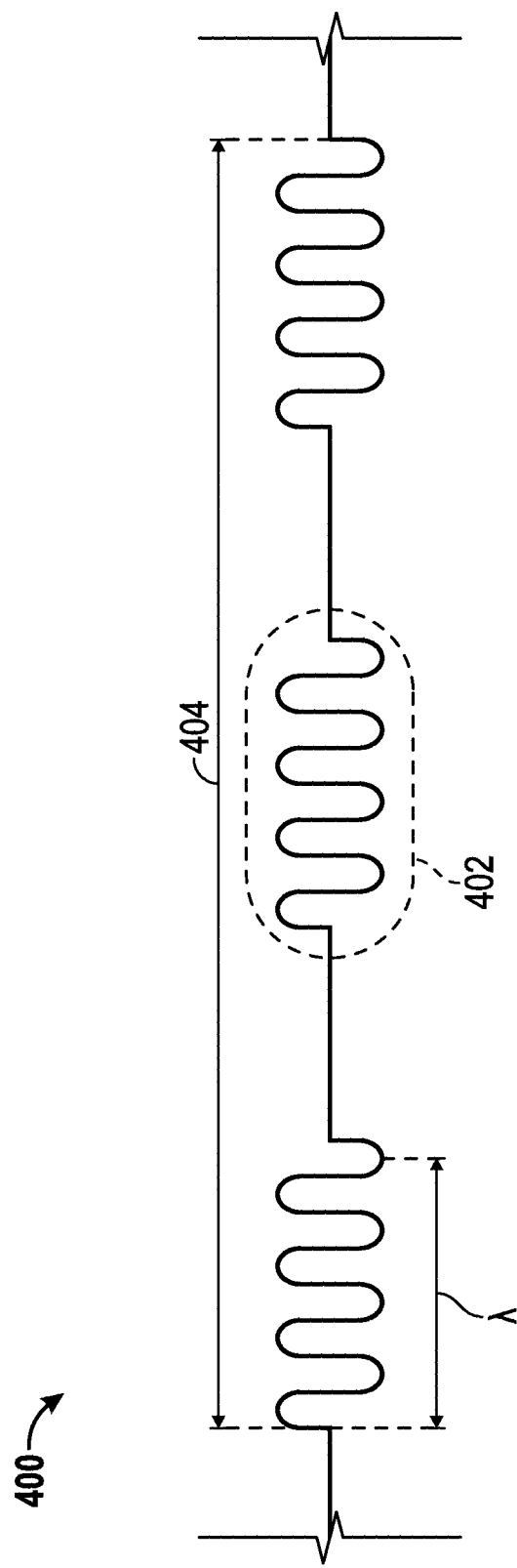
FIG. 4 illustrates an example stylus signal waveform according to examples of the disclosure.

FIG. 4 illustrates an example stylus signal waveform according to examples of the disclosure. In this example, stylus signal 400 can contain multiple steps 402. Each step can be of a pre-determined time period T. A grouping of steps can be called a burst. For instance, as illustrated, a stylus burst 404 can be made up of 3 stylus steps.

Figure 5:
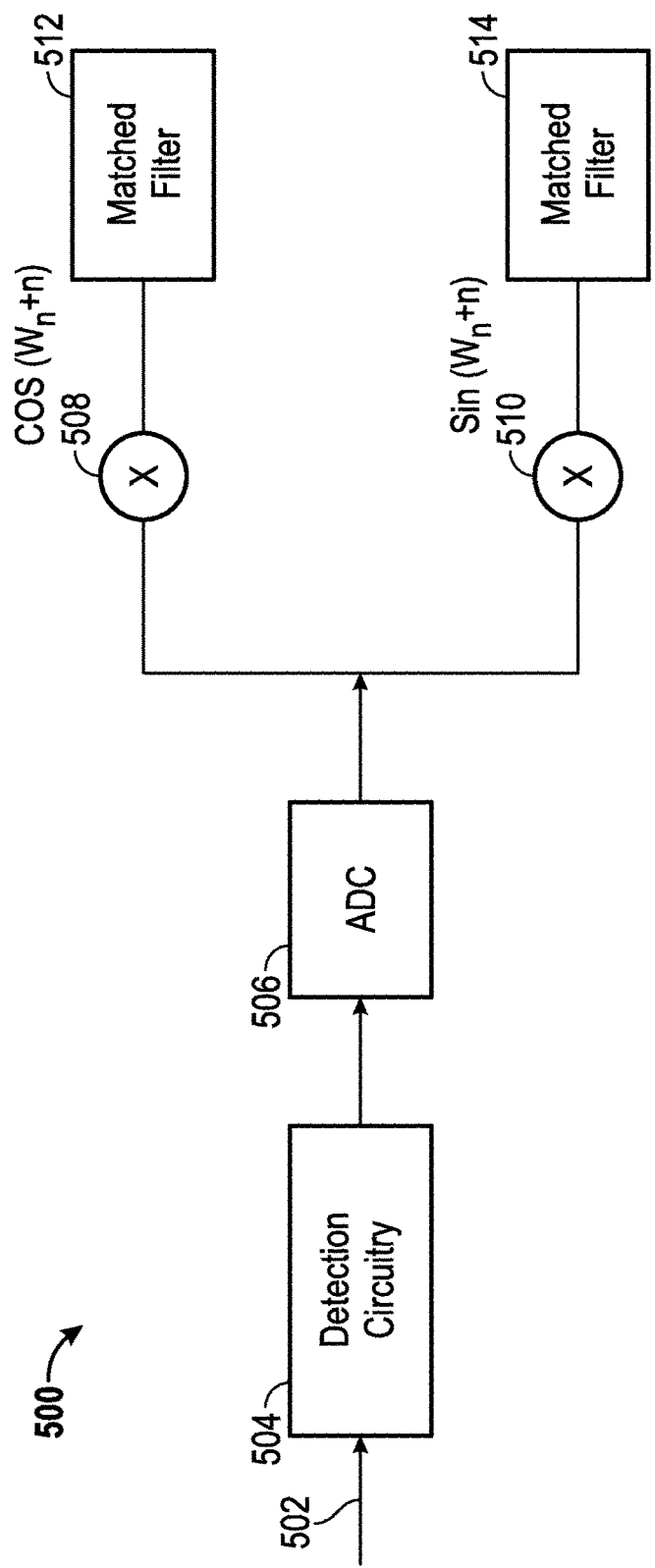
FIG. 5 illustrates an example touch/stylus demodulation circuit according to examples of the disclosure.

FIG. 5 illustrates an example touch/stylus demodulation circuit according to examples of the disclosure. The circuit of FIG. 5 shows an example implementation of a digital phase demodulation, known in the art. As illustrated, sense or drive line 502 can be inputted into detection circuitry 504. The detection circuitry can provide buffering and other pre-detection signal processing needs. The analog signal output from the detection circuitry 504 can then be converted to digital samples via analog-to-digital converter (ADC) 506. The output signal of ADC 506 can then be split into an I channel stream 508, and a Q channel stream 510, where they can each be multiplied by an in-phase and quadrature phase carrier, respectively. After being mixed with the in-phase and quadrature phase carrier, each stream can then be filtered using a matched filter 512 and 514.

Matched filter 512 and 514 can be implemented digitally by employing a windowing function that can be synchronized with the start time of incoming signal and the end time of an incoming signal. Thus in order to implement an efficient digital matched filter, the demodulator may need to have prior knowledge of the start time of a signal and the end time of the signal. In a touch detection mode, knowledge of the start time and end time of a signal can be readily accessed since the signal transmission on the drive line and the demodulation of the touch signal can be performed by the same touch controller. The touch controller can know at what time the signal started transmission and at what time the transmission ended. However, in stylus detection mode, the system may not have knowledge of the start and end time of a signal due to the fact that the stylus generates signals outside of the touch sensor panel, and there may be no communication of the start and stop time of a stylus signal between the stylus and the demodulator, thus making implementation of a windowed demodulation function difficult. Thus, in order to implement a windowed digital demodulation on a stylus signal, the demodulator may need to ascertain the beginning and end of a signal, in order to create an appropriate window.

Figure 6:
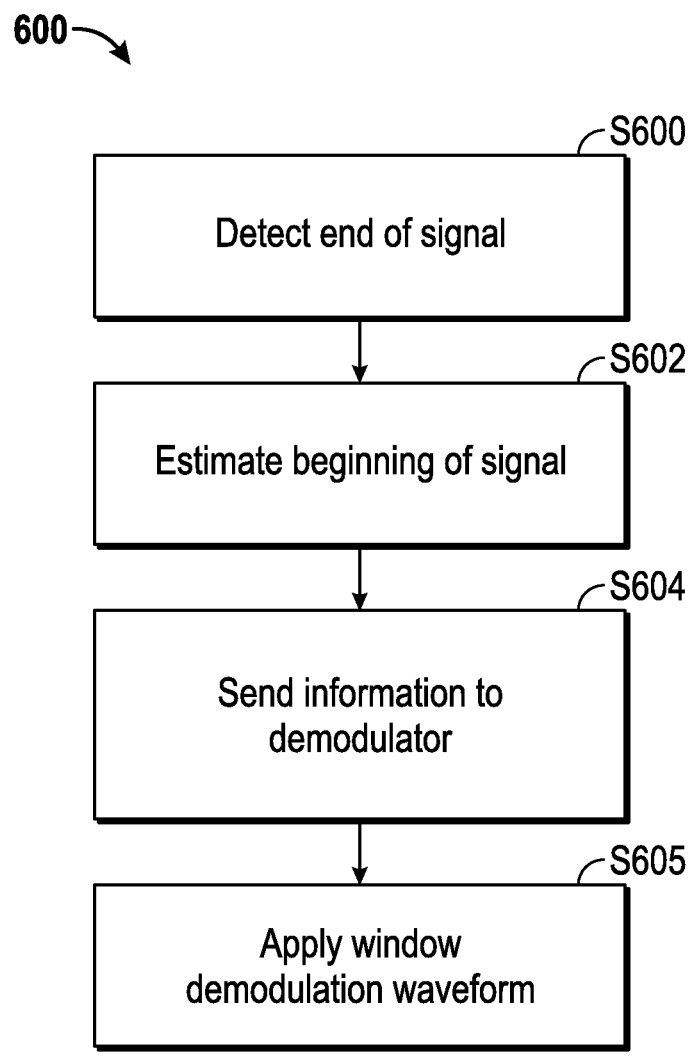
FIG. 6 illustrates a method of detecting the beginning and the end of a stylus signal waveform according to examples of the disclosure.

FIG. 6 illustrates a method of detecting the beginning and the end of a stylus signal waveform according to examples of the disclosure. In this example method, at step 600, the end of the stylus step can be detected. A method of detecting the end of the stylus step is discussed further below. At step S602, based on the detected end time of the stylus signal, the beginning time of the stylus step can be estimated. Since a stylus step is of a pre-determined duration, by determining the end of the stylus signal, the beginning time can be known. At step S604, the information of the beginning and end time of the stylus step can be sent to the demodulators which can then employ a synchronized window function to perform the demodulation of the stylus signal as described above.

Figure 7:
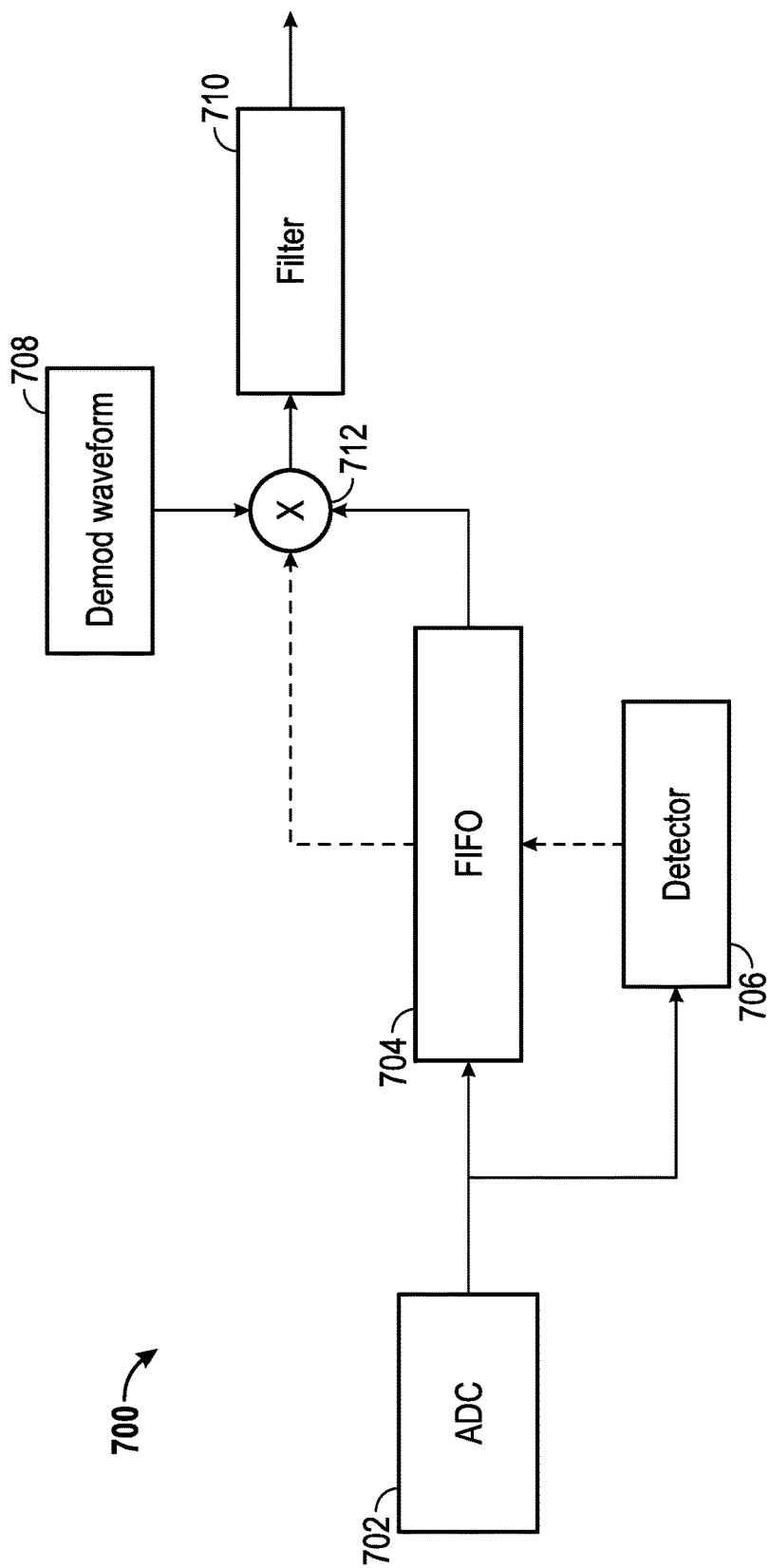
FIG. 7 illustrates an example stylus signal detector, integrated into a demodulation circuit according examples of the disclosure.

FIG. 7 illustrates an example stylus signal detector integrated into a demodulation circuit according examples of the disclosure. The circuit 700 can include an ADC 702 that digitizes the signals received from a touch/stylus sense channel. The digitized data can be fed into a first-in-first-out (FIFO) buffer 704 and detector 706. FIFO buffer 704 can create a time delay between the time a signal enters the buffer, and the time that the signal exits the buffer. FIFO buffer 704 can store values of the signal outputted by ADC and can subsequently output the signals after a pre-determined amount of time has passed. Detector 706 (described in further detail below) can detect the presence of a stylus signal, determine the starting time of the stylus signal, and determine the end time. When detector 706 determines the beginning and end of the stylus signal, it can assert a signal on its output to enable multiplier 712 so that the output of the FIFO buffer 704 and demodulation waveform generator 708 can be multiplied together. Detector 706, upon determining the beginning time of a stylus signal can enable multiplier 712 at the same time that FIFO buffer 704 begins to output the portion of the signal in the buffer corresponding to the beginning of the stylus signal. Detector 706 can then terminate the signal at its output, when the end of the stylus signal has passed out of FIFO buffer 704. In this way, the detector can act to "window" the stylus signal, in order to effectuate efficient digital demodulation as described above.

Figure 8:
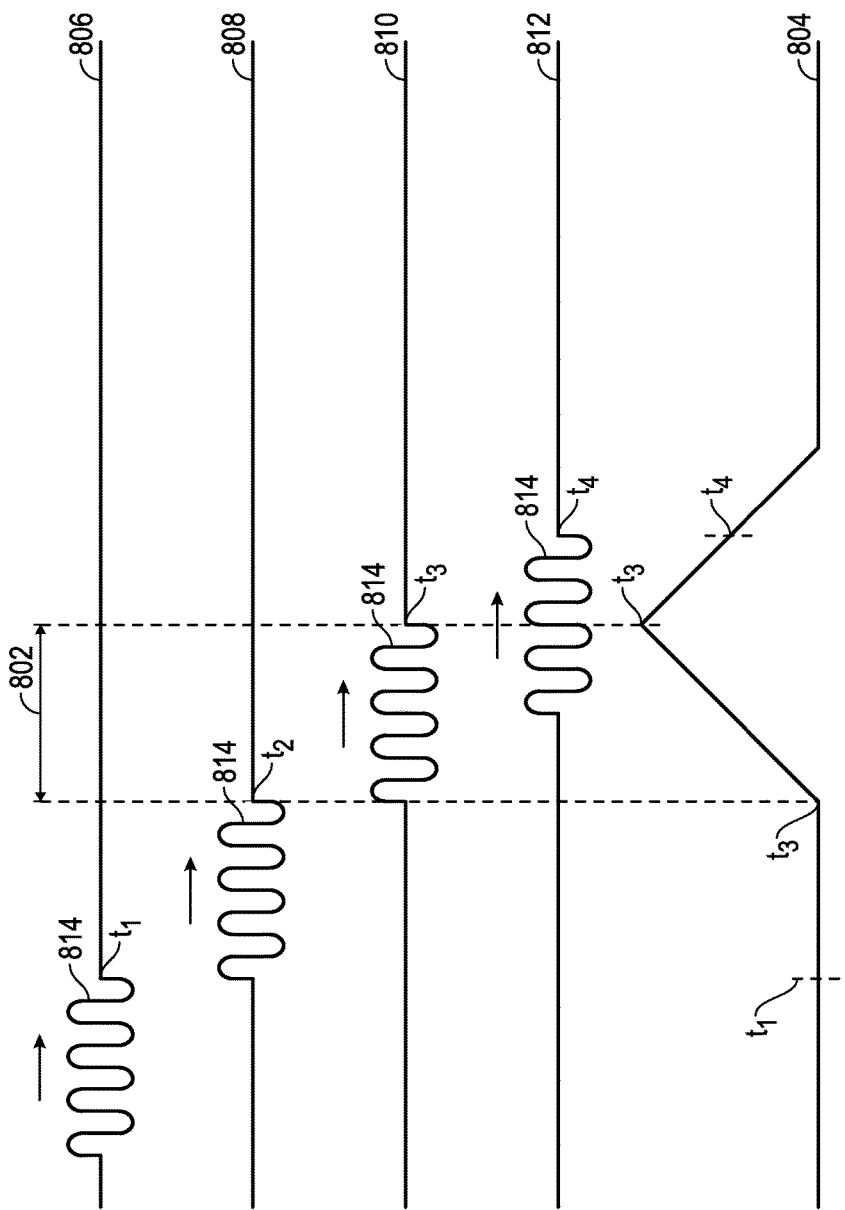
FIG. 8 illustrates an example concept for a stylus signal detector according to examples of the disclosure.

FIG. 8 illustrates an example concept for a stylus signal detector according to examples of the disclosure. FIG. 8 represents a time domain analysis of the stylus signal's interaction with an envelope detector. The detector 706 of FIG. 7 in one example can act as envelope detector that integrates a signal over a specific window of time. The detector 706 can be represented by window 802. The energy contained in window 802 at any given time can be represented by graph 804, which is a plot of the energy in the window as a function of time. For example, at t1 on plot 806, the stylus signal 814 has yet to enter the window 802. Thus, the energy in the window 802 as plotted on graph 804 can be zero as shown at the t1 mark on 804. At t2 on plot 808, the beginning edge of the stylus signal 814 begins to appear in the window. At corresponding t2 of plot 804 the magnitude of the signal within the window begins to rise. As signal 814 moves further into the window the detected energy within the window. At t3 on plot 810 the entire stylus signal can be contained within the window.

As shown in plot 804 at t3, the energy reaches a peak value. At t4, as the stylus signal moves out of the window, the energy in the window corresponding to t4 diminishes. Finally as the stylus signal moves completely out of the window, the energy in the window can return to a minimal value. The length of window 802 can be pre-determined and can correspond to the length in time of a stylus step signal. So, for instance, if a stylus step is 140 μs long, the window of the envelope detector can be set to 140 μs long. Correlating the length of the envelope detector to the length in time of the stylus signal can ensure that when the entire stylus signal is within the window 802, it can correspond to the peak of the signal plotted on graph 804. The length of the window however can be of a different size than the length in time of a stylus signal in other examples.

The stylus detector can thus determine the end of the stylus signal by detecting the peak signal generated by the envelope detector. As shown in FIG. 8, when the peak of signal on graph 804 is reached, it can correspond to the time when the stylus signal is fully encapsulated within the window. By detecting the peak, the detector can thus ascertain the end time of the stylus signal, and since the stylus signal is of a pre-determined duration, the detector can then know the beginning time of the stylus signal.

Figure 9:
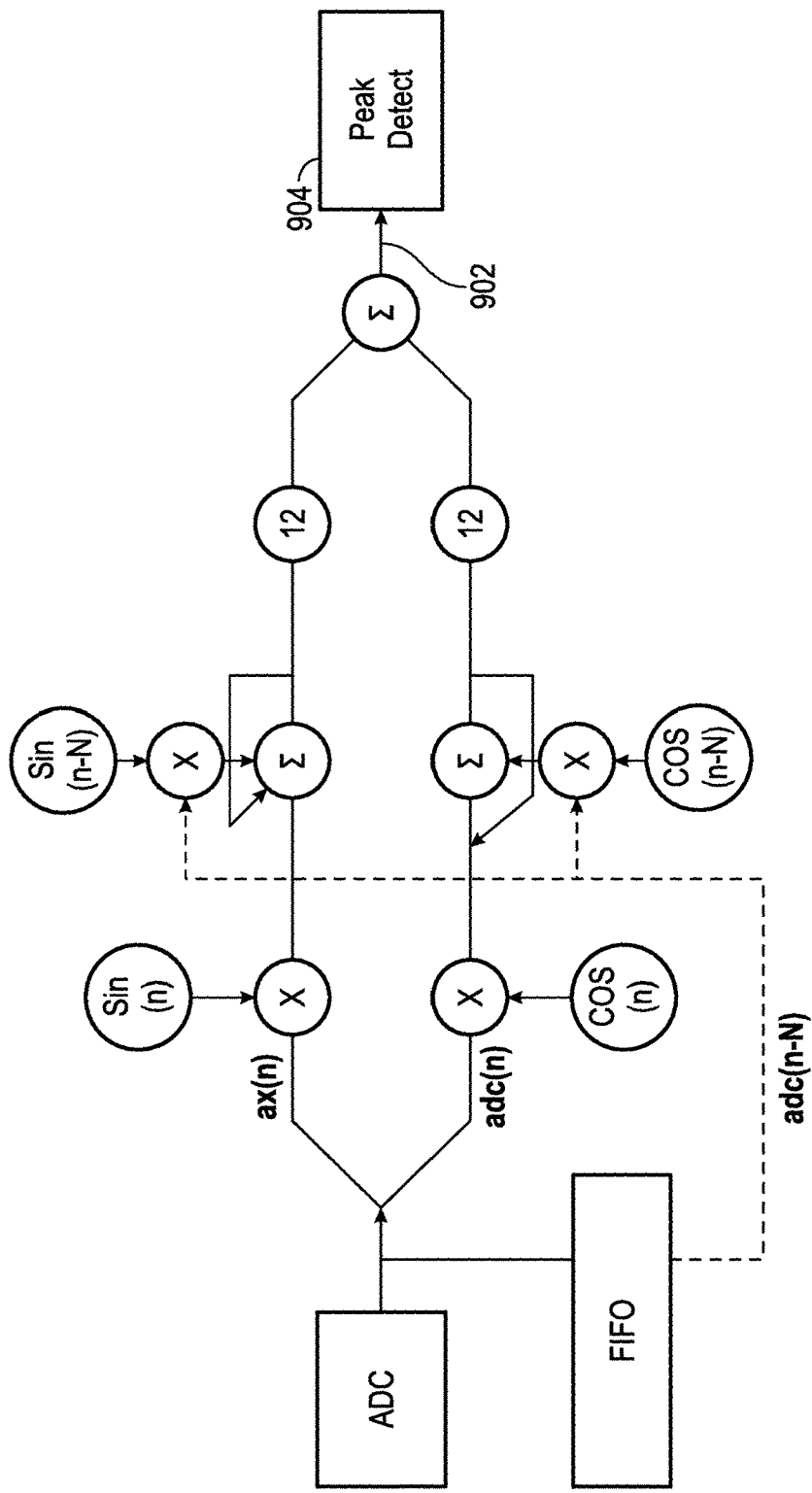
FIG. 9 illustrates an example implementation of an envelope detector according to examples of the disclosure.

A stylus detector as described above can, in some examples, be implemented as a single frequency discrete Fourier transfer that integrates the energy of a signal over a specific duration of time. The discrete Fourier transfer can be implemented using various methods known in the art, for instance a fast Fourier transform, a zero crossing detection or a Goertzl Algorithm. FIG. 9 illustrates an example implementation of an envelope detector according to examples of the disclosure. The circuit depicted in FIG. 9 is known in the art as a circuit implementation of a sliding I/Q demodulator that can perform a single frequency discrete time Fourier transform. The output 902 of the circuit can be sent to a peak detector 904.

Figure 10:
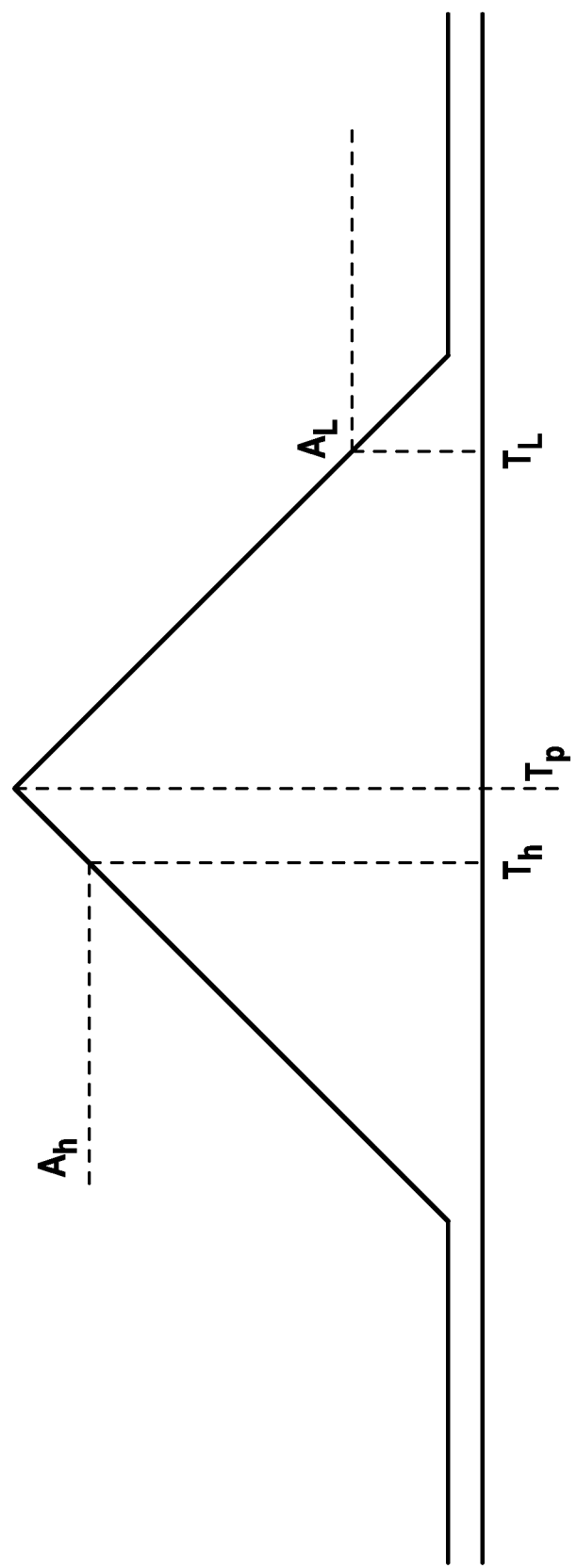
FIG. 10 illustrates an exemplary centroid peak detection method according to examples of the disclosure.

Peak detector 904 can be implemented using many methods known in the art. For instance, a threshold method can be employed in which the peak of the signal is detected when the signal crosses a pre-determined threshold. This method can, however, be susceptible to corruption from noise, since noise can cause the signal to prematurely exceed the threshold, thus causing the time estimates for the peak to be erroneous. Centroid detection (i.e., detecting the geometric center of a shape) can be employed in the time domain to find the peak of a signal. FIG. 10 illustrates an exemplary centroid peak detection method according to examples of the disclosure. As illustrated in FIG. 10, two pre-determined thresholds $A_h$ and $A_1$ can be pre-determined. $A_h$ can be the initial threshold encountered in time, and $A_1$ can be the second threshold encountered in time. The thresholds can be set such that they give the peak detector hysteresis, thus making the detector more robust to noise. In other words the thresholds can be set so that they are not equal. The peak detector can record the time at which the thresholds are crossed by the signal. Thus, $T_h$ can correspond to the time when the first threshold is crossed and $T_1$ can correspond to the time when the second threshold is crossed. Once $T_h$ and $T_1$ are obtained by the peak detector, the centroid in time can be calculated using the following equation.

$$T_p = \frac{(T_h \cdot A_h + T_l \cdot A_l)}{(A_h + A_l)}$$

The equation above relates to a 2 point centroid calculation. The equation above can be generalized to a multi-point centroid calculation using the equation below:

$$T_p = \frac{\sum_i T_i \cdot A_i}{\sum A_i}$$

As discussed above, Tp can be equivalent to the time when the end of the stylus signal occurs. Since the stylus signal is of a pre-determined duration, the beginning of the stylus signal can be calculated and the information used to generate the window and enable proper demodulation of the stylus signal.

Stylus detectors can be aggregated amongst the stylus sense channels in various ways in order to create a uniform signal to noise ratio, while at the same time minimizing the effects of common mode noise on a stylus detector. Aggregation can refer to the distribution of detectors amongst the stylus sense channels and can also refer to how stylus sense channels are combined at each detector to determine the beginning and end of a stylus signal. Stylus detector aggregation schemes can be evaluated using at least two metrics. First, the minimum signal level into each detector can be monitored as the stylus moves across the sense channels. This can be important due to the fact that the detected signal power level can effect signal to noise ratios. Aggregation can be used to maximize the signal and keep it as uniform as possible as the stylus moves across the touch screen. Second, aggregation can be used to minimize the number of detectors used on the touch screen.

Figures 11A, 11B:
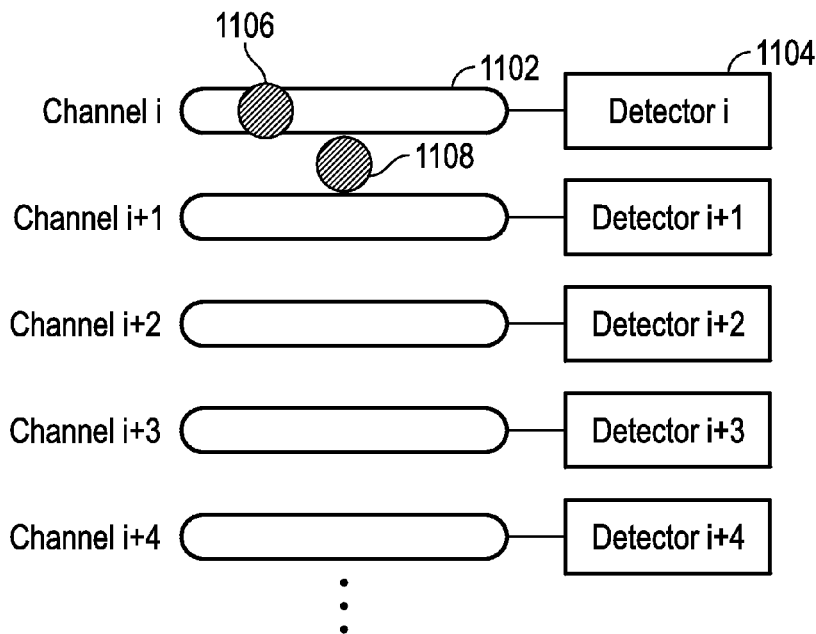

FIG. 11a illustrates an example stylus detector aggregation scheme according to examples of the disclosure. In this example, each stylus sense channel can have a dedicated detector coupled to it. As illustrated, each sense channel 1102 can have a stylus detector 1104 as described above coupled to it. For instance channel i can have detector i coupled to it. Channel i+1 can have detector i+1 attached to it, and so on and so forth. While only 4 channels are shown, the disclosure is not so limited and there can be as many channels as necessary to cover the area of a touch screen. Also illustrated in FIG. 11a are stylus touches 1106 and 1108. Stylus touch 1106 can represent a stylus that touches the touch screen directly on top of a stylus signal sense channel. Stylus touch 1108 can represent a stylus that touches the touch screen in between two stylus signal sense channels.

FIG. 11b illustrates an example detector chart corresponding to the aggregation scheme of FIG. 11a. The chart can be read as follows. The rows of the chart can represent stylus sense channels depicted in FIG. 11a. For instance, C(i) can represent channel i+1, c(ii) channel i+2, etc. The columns of the chart can represent stylus detectors depicted in FIG. 11b. For instance d(i) can represent detector i+1, etc. As shown at cell (c(i), d(i)), a plus (+) symbol can indicate that a particular channel is connected to a detector. For instance, at (c(i), d(i)), the plus symbol indicates that channel (i) is connected to detector (i). At (c(i), d(i+1)) there is no symbol, thus indicating that there is no connection between channel i and detector i+1. The chart of FIG. 11b can be helpful in analyzing the effectiveness of a particular aggregation scheme. For instance, the aggregation scheme of FIG. 11a can have non-uniform SNR as the stylus signal moves across the touch screen. At touch 1106, depicted in FIGS. 11a and 11b, the stylus can transmit its entire energy into the detector (i) since it is directly on top of channel i. However, touch 1108, depicted at 1108, is located partially between channel i and channel i+2. This can mean that detector i will only receive about half of the energy from the stylus signal, while detector i+1 can receive the other half. This can mean that each detector may have a smaller SNR since each only receives only half of the energy from the stylus.

Figure 12A:
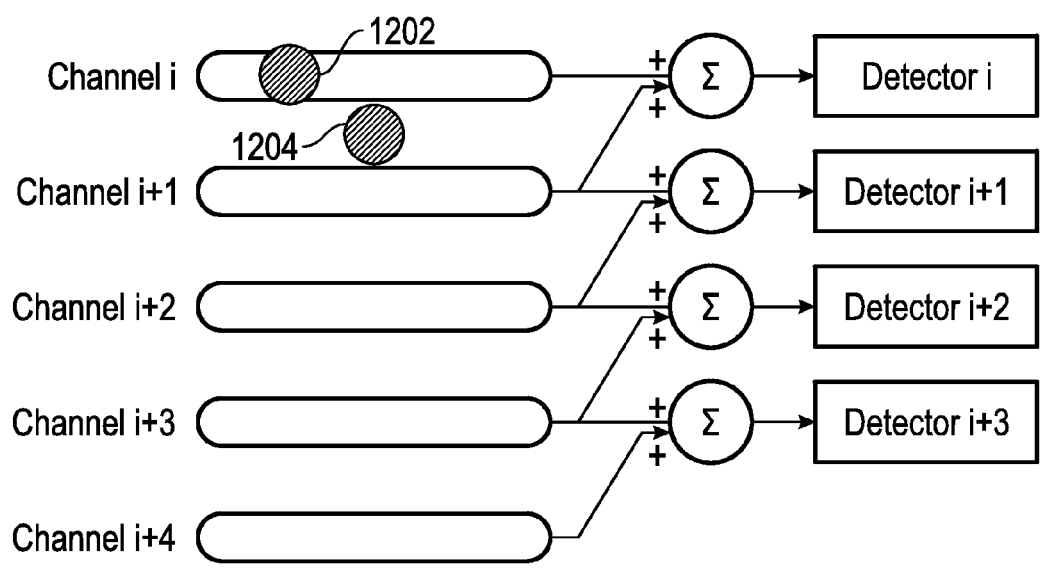
FIG. 12a illustrates another exemplary stylus detector aggregation scheme according to examples of the disclosure.

FIG. 12a illustrates another exemplary stylus detector aggregation scheme according to examples of the disclosure. The stylus detector aggregation scheme of FIG. 12a can be described as a paired aggregation. As illustrated, detector i can be coupled to two channels i and i+1. Specifically, channels i and i+1 are summed together and the summed signal in then inputted into detector i. Channels i+1 and i+2 are summed together and the summed signal is then inputted into detector i+2 and so on. Also, stylus touches 1202 and 1206 can represent the stylus touching the touch screen. Stylus touch 1202 can represent the instance when the stylus is directly touching and is on top of channel i. Stylus touch 1206 can represent when the stylus is in between channel i and channel i+1.

FIG. 12b illustrates the corresponding detector chart of FIG. 12a. As illustrated, detector i can be coupled to sense channels i and i+1. The + symbol corresponding to the channels i and i+1 can represent the fact that each channel is summed together into the detector. By having two adjacent channels summed together and then fed into the detector, the issue of non-uniform SNR can be mitigated. For instance, when the stylus is in between two channels as is stylus touch 1206, detector i can receive the full signal since detector i receives the sum of channel i (which receives half the stylus signal) and channel i+1 (which receives the other half of the stylus signal). Thus, the aggregation scheme of FIG. 12a can produce a uniform SNR despite is the location of the stylus, whether it is directly on top of a sense channel or in between sense channels.

The aggregation scheme depicted in FIG. 12a however can produce a signal to the stylus detector that has more common mode noise than the aggregation scheme depicted in FIG. 11a. If each channel contains a certain amount of common mode noise, by summing the channels together and then inputting the sum into a detector, the noise on each channel can also be summed. This can increase the magnitude of the noise seen by the detector and can create a diminished SNR.

Figure 13A:
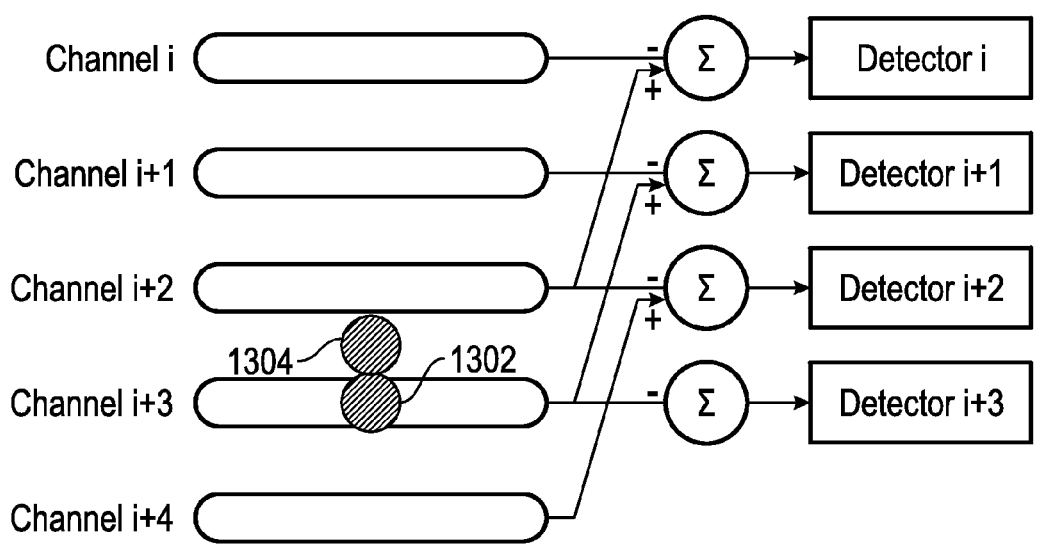
FIG. 13a represents yet another exemplary stylus detector aggregation scheme according to examples of the disclosure.

FIG. 13a represents yet another exemplary stylus detector aggregation scheme according to examples of the disclosure. In this example, the signal on channel i can be subtracted from the signal on channel i+2 and the result inputted into detector i. The signal on channel i+1 can be subtracted from the signal on channel i+3 and the result inputted into detector i+1. This pattern can be repeated for each detector. By subtracting one signal from another, the common mode noise present in the signal inputted into the stylus detector can be minimized, since the noise signals will be also subtracted from each other. The noise signals present on each channel can be correlated with each other in order to ensure that when subtracted from each other, they effectively cancel each other out. In order to ensure that the noise signals are correlated, channels that are in spatial proximity to each other can be chosen to be subtracted from each other. However, having the channels too close to each other can mean that if a stylus signal is present on both channels, the stylus signals may also cancel or partially cancel each other out. If the stylus signals are subtracted from each other, the SNR into the stylus detector may be diminished. In the example of FIG. 13a, detector i, for instance, is fed channel i subtracted from channel i+2. In this example, the subtracted channel is in close proximity to the other channel while at the same time not being so close in proximity that stylus signals maybe subtracted from each other. Thus, if a stylus touch is applied at 1302, which is directly on top of a stylus channel, the common mode noise can be minimized by the subtraction. If a stylus touch is applied at 1304, which is in between two sense channels, the subtraction will not result in the cancellation of the stylus signals because the stylus signal would be present on two channels. However, if the stylus tip were to be larger, such that it could occupy two sense channels, then the aggregation scheme illustrated in FIG. 13a may not be adequate in ensuring that stylus signals don't get canceled out as a result of the subtraction.

FIG. 13b illustrates a detector chart corresponding to the example of FIG. 13a. As discussed above, the example of FIG. 13a uses non-adjacent channels to perform subtraction in order to mitigate common mode noise. However, as shown in FIG. 13b, this detector aggregation scheme can lead to a non-uniform SNR as the stylus moves across the panel. For instance, at stylus touch 1302, the stylus is directly on top of a channel and thus the detector can receive a full signal. However at stylus touch 1304, the detector may only receive half of the stylus signal and thus the SNR can vary depending on the location of the stylus.

FIG. 14 illustrates an exemplary detector chart of a stylus detector aggregation scheme according to examples of the disclosure. In this example, as illustrated, detector i receives the sum of channel i+1 and channel i+2, subtracted by the sum of channel i and channel i+3. Detector i+1 receives the sum of channel i+2 and channel i+3, subtracted by the sum of channel i+1 and i+4. This pattern can continue for each detector. The aggregation scheme depicted in FIG. 14 can provide a uniform stylus signal independent of position of the stylus, because no matter whether the stylus is directly on a channel or between channels, its total energy can be received by one detector. Furthermore, the aggregation scheme depicted in FIG. 14 can provide good common mode noise suppression since the channels in close proximity to the summed channels are used to subtract out any potential common mode noise. The proximity of the channels used to subtract noise can provide good noise correlation to the noise encountered by the channels that contain stylus signals.

While various aggregation schemes can be used to ensure a uniform SNR and minimized common mode noise as the stylus moves across the panel, another goal of aggregation can be to reduce the number of detectors needed by the sensor panel.

Figure 15A:
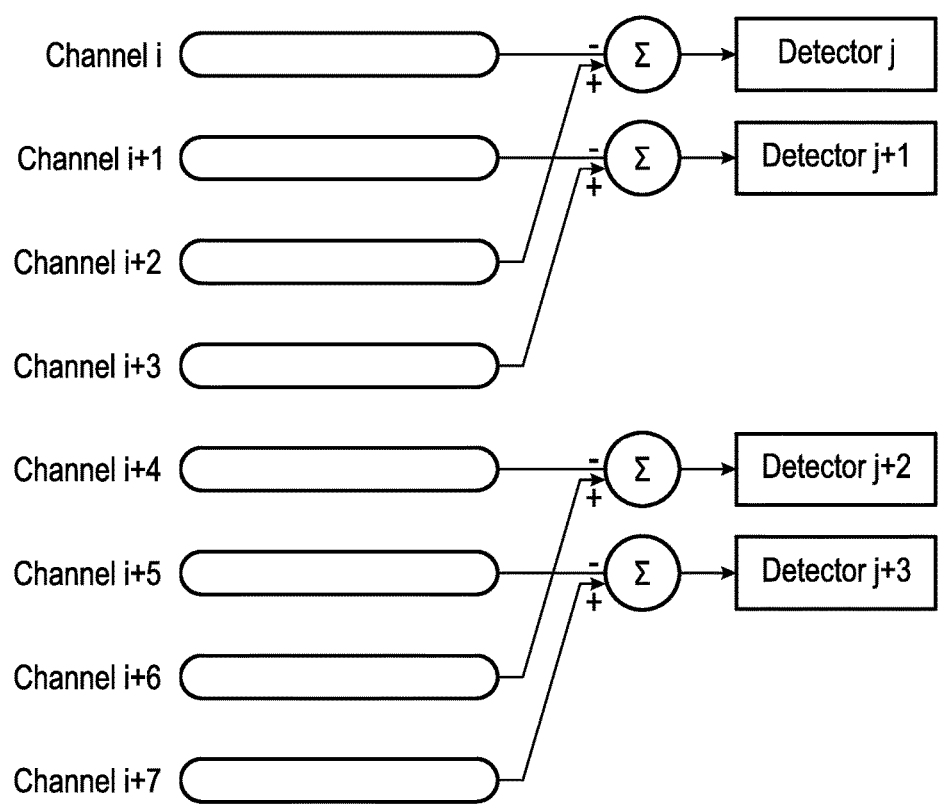
FIG. 15a illustrates an exemplary detector aggregation scheme according to examples of the disclosure.

FIG. 15a illustrates an exemplary detector aggregation scheme according to examples of the disclosure. The aggregation scheme depicted in FIG. 15a is nearly identical to aggregation scheme depicted in FIG. 13 except that only half of the detectors are used for detection. In other words, the detectors are spaced farther apart, meaning that there are fewer detectors on the panel.

FIG. 15b illustrates a detector chart corresponding to the aggregation schemed depicted in FIG. 15a. As illustrated, by spacing the detectors farther apart, the stylus signal can be non-uniform as it moves across the panel. This result may be acceptable, however, if the common mode noise has good suppression due to the differential inputs to the detectors.

In the absence of noise, the panel would only require one solitary detector. All of the channels could be summed, and the result could be received by one detector. The number of detectors required by the panel to ensure common mode suppression can be a function of how correlated the noise is across the panel. For instance, if the noise on the touch sensor panel was globally correlated (in other words, the noise received by each channel is correlated to the noise received by all of the other channels), the panel could only use two detectors. FIG. 16 illustrates an aggregation scheme that uses only two detectors according to examples of the disclosure. The aggregation scheme depicted in FIG. 16 can work to ensure uniform SNR as the stylus moves across the panel; however common mode noise suppression can only be adequate if the noise is globally correlated across the entire panel.

If the noise is not globally correlated across the panel and instead is correlated within regions of the panel, the panel can be split into parts and the aggregation scheme of FIG. 16 can be applied. For instance, if the noise on the panel were correlated within halves of the screen, such that the noise on one half of the screen was correlated, while the noise on the other half of the screen was globally correlated, then the panel could be sectioned off into halves, and each half could have the detector scheme of FIG. 15 applied to it. FIG. 17 illustrates an exemplary aggregation scheme according to examples of the disclosure. As illustrated, detectors 1 and 2 are used to detect stylus signals in the upper half of the panel, while detectors 3 and 4 are used to detect stylus signals in the lower half of the panel.

Figure 18:
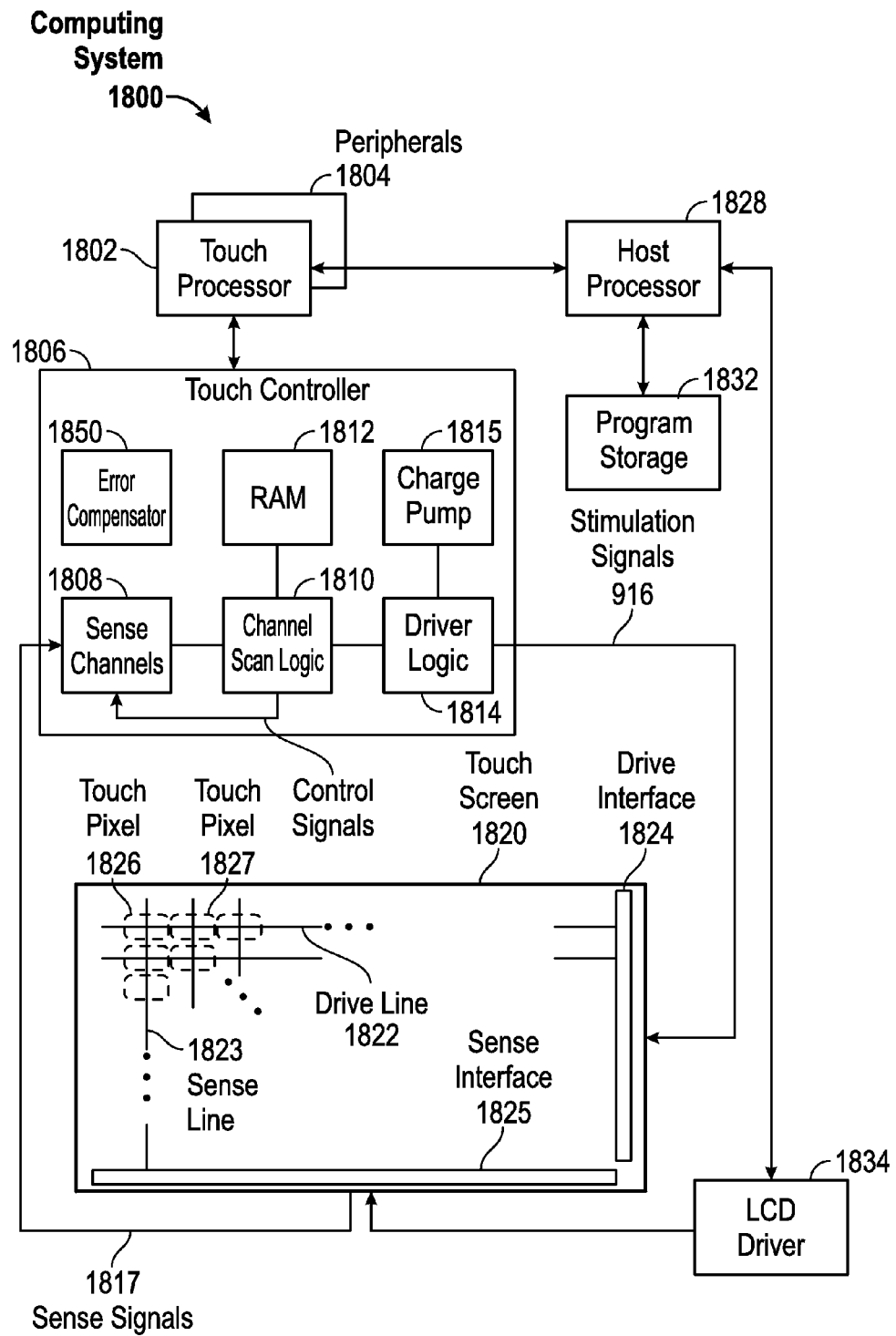
FIG. 18 is a block diagram of an example computing system that illustrates one implementation of a touch sensor panel display with stylus signal noise correction according to examples of the disclosure.

FIG. 18 is a block diagram of an example computing system that illustrates one implementation of a touch sensor panel display with stylus signal noise correction according to examples of the disclosure. Computing system 1800 could be included in, for example, mobile telephone 136, digital media player 140, personal computer 144, or any mobile or non-mobile computing device that includes a touch screen. Computing system 1800 can include a touch sensing system including one or more touch processors 1802, peripherals 1804, a touch controller 1806, and touch sensing circuitry. Peripherals 1804 can include, but are not limited to, random access memory (RAM) or other types of memory or storage, watchdog timers and the like. Touch controller 1806 can include, but is not limited to, one or more sense channels 1809, channel scan logic 1810 and driver logic 1814. Channel scan logic 1810 can access RAM 1812, autonomously read data from the sense channels and provide control for the sense channels. In addition, channel scan logic 1810 can control driver logic 1814 to generate stimulation signals 1816 at various frequencies and phases that can be selectively applied to drive regions of the touch sensing circuitry of touch screen 1820, as described in more detail below. In some examples, touch controller 1806, touch processor 102 and peripherals 1804 can be integrated into a single application specific integrated circuit (ASIC).

Computing system 1800 can also include a host processor 1829 for receiving outputs from touch processor 1802 and performing actions based on the outputs. For example, host processor 1829 can be connected to program storage 1832 and a display controller, such as an LCD driver 1834. Host processor 1829 can use LCD driver 1834 to generate an image on touch screen 1820, such as an image of a user interface (UI), and can use touch processor 1802 and touch controller 1806 to detect a touch on or near touch screen 1820, such a touch input to the displayed UI. The touch input can be used by computer programs stored in program storage 1832 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1829 can also perform additional functions that may not be related to touch processing.

Integrated display and touch screen 1820 can include touch sensing circuitry that can include a capacitive sensing medium having a plurality of drive lines 1822 and a plurality of sense lines 1823. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 1822 can be driven by stimulation signals 1816 from driver logic 1814 through a drive interface 1824, and resulting sense signals 1817 generated in sense lines 1823 can be transmitted through a sense interface 1825 to sense channels 1809 (also referred to as an event detection and demodulation circuit) in touch controller 1806. In this way, drive lines and sense lines can be part of the touch sensing circuitry that can interact to form capacitive sensing nodes, which can be thought of as touch picture elements (touch pixels), such as touch pixels 1826 and 1827. This way of understanding can be particularly useful when touch screen 1820 is viewed as capturing an "image" of touch. In other words, after touch controller 1806 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 19:
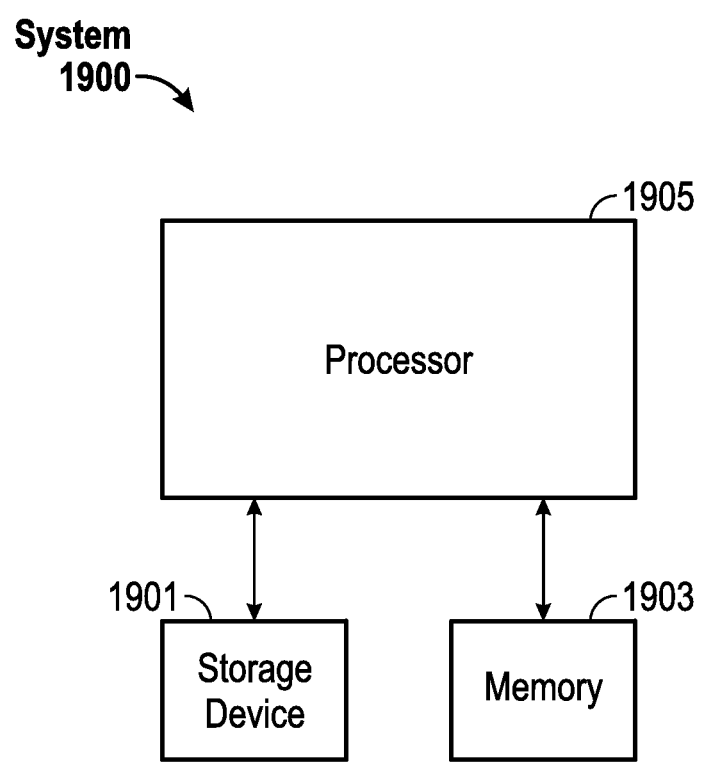
FIG. 19 illustrates an exemplary system for generating or processing a stylus stimulation signal according to examples of the disclosure.

One or more of the functions relating to the generation or processing of a stylus stimulation signal described above can be performed by a system similar or identical to system 1900 shown in FIG. 19. System 1900 can include instructions stored in a non-transitory computer readable storage medium, such as memory 1903 or storage device 1901, and executed by processor 1905. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the system is not limited to the components and configuration of FIG. 19, but can include other or additional components in multiple configurations according to various examples. Additionally, the components of system 1900 can be included within a single device, or can be distributed between multiple devices.

Figure 20A:
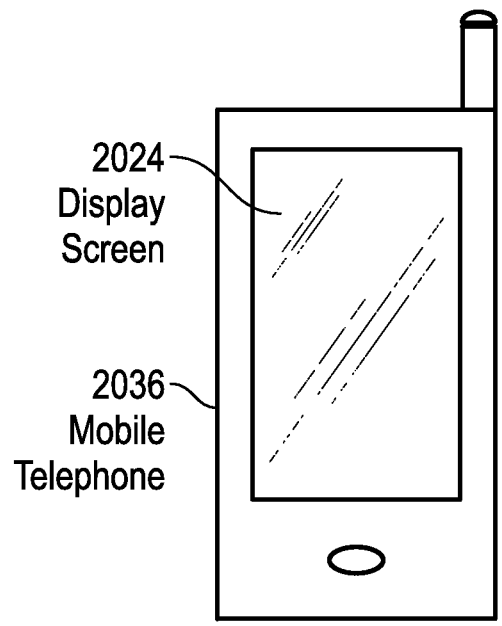
FIG. 20a-d illustrate exemplary personal devices that include a touch sensor according to various examples.
Figure 20B:
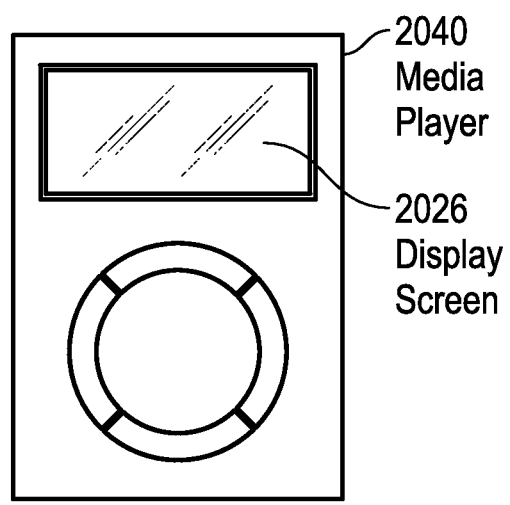
Figure 20C:
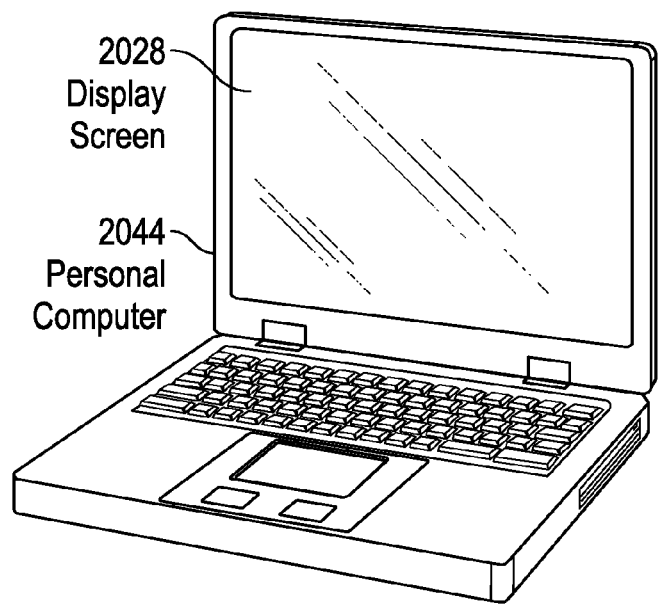
Figure 20D:
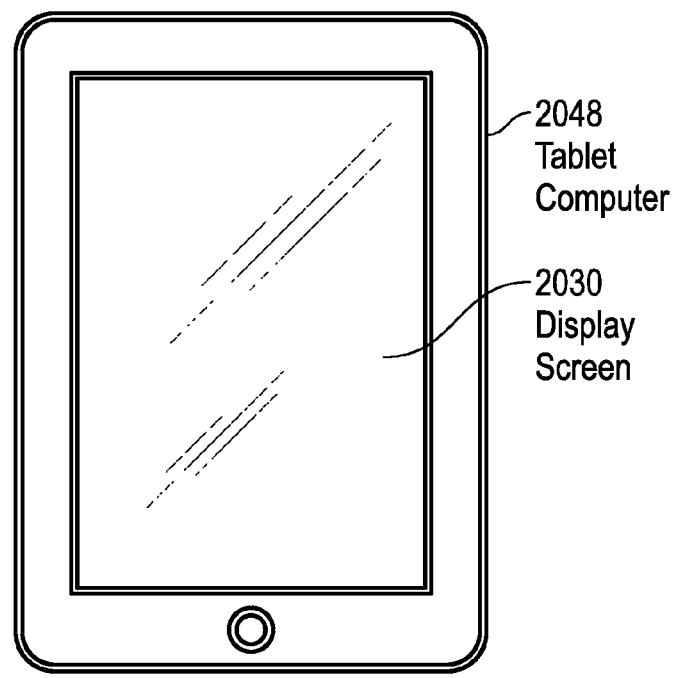

FIGS. 20A-20D show example systems in which touch sensor panels according to examples of the disclosure may be implemented. FIG. 20A illustrates an example mobile telephone 2036 that includes a touch sensor panel 2024. FIG. 20B illustrates an example digital media player 2040 that includes a touch sensor panel 2026. FIG. 20C illustrates an example personal computer 2044 that includes a touch sensor panel 2028. FIG. 20D illustrates an example tablet computing device 2048 that includes a touch sensor panel 2030.

Therefore, according to the above, some examples of the disclosure are directed to a stylus detection apparatus for detecting contacts from a stylus, the apparatus comprising a touch sensor panel comprising a plurality of electrodes, each electrode configured to receive and transmit one or more signals from a stylus, a channel aggregator configured to combine the signals transmitted by the plurality of electrodes to create a plurality of aggregated signals, and one or more stylus signal detectors, each detector configured to receive one of the aggregated signals of the plurality of aggregated signals from the channel aggregator and determine a presence and signal strength of a stylus signal based on the received signal. Additionally or alternatively to one or more of the examples disclosed above, in some examples, the channel aggregator is configured to separate one or more signals transmitted by the plurality of electrodes into a first group, and further configured to sum the one or more signals of the first group to generate an aggregated signal. Additionally or alternatively to one or more of the examples disclosed above, in some examples, the one or more of the electrodes of the first group are chosen such that a detected signal strength of the stylus is uniform and independent of the stylus' position on the touch sensor panel. Additionally or alternatively to one or more of the examples disclosed above, in some examples, the channel aggregator is further configured to separate the one or more signals transmitted by the plurality of electrodes into a second group, and further configured to subtract the one or more signals from the aggregated signal. Additionally or alternatively to one or more of the examples disclosed above, in some examples, the one or more of the electrodes of the second group of the electrodes are chosen such that a noise signal transmitted by second group of electrodes is correlated to a noise signal transmitted by the first group of electrodes. Additionally or alternatively to one or more of the examples disclosed above, in some examples, the first group and the second group are mutually exclusive. Additionally or alternatively to one or more of the examples disclosed above, in some examples, a number of the stylus signal detectors is based in part on a spatial correlation of a plurality of noise signals transmitted on the plurality of electrodes of the touch sensor panel.

Some examples of the disclosure are directed to a method for detecting contacts from a stylus signal, the method comprising receiving one or more stylus signals on a plurality of electrodes of a touch sensor panel, combining the signals transmitted by the plurality of electrodes to create a plurality of aggregated signals, and inputting the one more aggregated signals into one more stylus signal detectors, each detector configured to receive one of the aggregated signals of the plurality of aggregated signals from the channel aggregator and determine the presence and signal strength of a stylus signal based on the received signal. Additionally or alternatively to one or more of the examples disclosed above, in some examples, combining the signals includes separating the one or more signals transmitted by the plurality of electrodes into a first group and summing the one more signals of the first group to generate an aggregated signal. Additionally or alternatively to one or more of the examples disclosed above, in some examples, the method further comprises choosing the one or more of the electrodes of the first group such that a detected signal strength of the stylus is uniform and independent of the stylus' position on the touch sensor panel. Additionally or alternatively to one or more of the examples disclosed above, in some examples, combining the signals further includes separating the one or more signals transmitted by the plurality of electrodes into a second group, and subtracting the one or more signals from the aggregated signal. Additionally or alternatively to one or more of the examples disclosed above, in some examples, the method further comprises choosing the one or more electrodes of the second group of electrodes such that a noise signal transmitted by second group of electrodes is correlated to a noise signal transmitted by the first group of electrodes. Additionally or alternatively to one or more of the examples disclosed above, in some examples, the first group and the second group are mutually exclusive. Additionally or alternatively to one or more of the examples disclosed above, in some examples, a number of stylus signal detectors is based in part on the spatial correlation of a plurality of noise signals transmitted on the plurality of electrodes of the touch sensor panel.

Some examples of the disclosure are directed to a non-transitory computer readable storage medium having stored thereon a set of instructions for detecting contacts from a stylus signal that when executed by a processor causes the processor to receive one or more stylus signals on a plurality of electrodes of a touch sensor panel, combine the signals transmitted by the plurality of electrodes to create a plurality of aggregated signals, and input the one more aggregated signals into one more stylus signal detectors, each detector configured to receive one of the aggregated signals of the plurality of aggregated signals from the channel aggregator and determine the presence and signal strength of a stylus signal based on the received signal. Additionally or alternatively to one or more of the examples disclosed above, in some examples, combining the signals includes separating the one or more signals transmitted by the plurality of electrodes into a first group and summing the one more signals of the first group to generate an aggregated signal. Additionally or alternatively to one or more of the examples disclosed above, in some examples, the processor is further caused to choose the one or more of the electrodes of the first group such that a detected signal strength of the stylus is uniform and independent of the stylus' position on the touch sensor panel. Additionally or alternatively to one or more of the examples disclosed above, in some examples, combining the signals further includes separating the one or more signals transmitted by the plurality of electrodes into a second group, and subtracting the one or more signals from the aggregated signal. Additionally or alternatively to one or more of the examples disclosed above, in some examples, the processor is further caused to choose the one or more electrodes of the second group of electrodes such that a noise signal transmitted by second group of electrodes is correlated to a noise signal transmitted by the first group of electrodes. Additionally or alternatively to one or more of the examples disclosed above, in some examples, the first group and the second group are mutually exclusive. Additionally or alternatively to one or more of the examples disclosed above, in some examples, a number of stylus signal detectors is based in part on the spatial correlation of a plurality of noise signals transmitted on the plurality of electrodes of the touch sensor panel.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A stylus detection apparatus for detecting an asynchronous active stylus, the apparatus comprising:
   a plurality of sense channels, each sense channel including an amplifier, wherein the plurality of sense channels are configured to sense signals at a plurality of electrodes of a touch sensor panel, the signals including one or more stylus signals generated by the asynchronous active stylus;
   a channel aggregator coupled to receive outputs of the plurality of sense channels and configured to generate one or more aggregated signals based on combinations of the outputs of the plurality of sense channels, wherein the channel aggregator is configured to sum at least two of a plurality of first signals sensed at a plurality of first electrodes of the plurality of electrodes to generate at least one aggregated signal; and
   one or more stylus signal detectors, each stylus signal detector configured to:
     receive one of the aggregated signals from the channel aggregator;
     detect one of the stylus signals based on the received aggregated signal; and
     estimate a start time and an end time for the detected stylus signal.

2. The apparatus of claim 1, wherein the plurality of first electrodes are chosen such that a detected signal strength of the stylus signal is uniform and independent of the active stylus' position on the touch sensor panel.

3. The apparatus of claim 1, wherein the channel aggregator is further configured to subtract one or more second signals sensed at one or more second electrodes of the plurality of electrodes from a sum of the plurality of first signals, wherein the first signals and the second signals are sensed simultaneously.

4. The apparatus of claim 3, wherein the one or more second electrodes are chosen such that a noise signal received at the one or more second electrodes is correlated to a noise signal received at the plurality of first electrodes.

5. The apparatus of claim 3, wherein the plurality of first electrodes and the one or more second electrodes are mutually exclusive.

6. The apparatus of claim 1, wherein a number of the stylus signal detectors is based in part on a spatial correlation of a plurality of noise signals received at the plurality of electrodes of the touch sensor panel.

7. A method for detecting an asynchronous active stylus, the method comprising:
- sensing, by a plurality of sense channels, one or more active stylus signals at a plurality of electrodes of a touch sensor panel, the one or more active stylus signals generated by the asynchronous active stylus, wherein each sense channel includes an amplifier;
- generating one or more aggregated signals based on combinations of outputs of the plurality of sense channels, wherein generating the one or more aggregated signals includes summing at least two of a plurality of first signals sensed at a plurality of first electrodes of the plurality of electrodes to generate at least one aggregated signal; and
- at a stylus signal detector:
  - detecting one of the stylus signals based on the received aggregated signal; and
  - estimating a start time and an end time for the detected stylus signal.

8. The method of claim 7, further comprising choosing the plurality of first electrodes such that the detected signal strength of the stylus signal is uniform and independent of the active stylus' position on the touch sensor panel.

9. The method of claim 7, wherein generating the one or more aggregated signals further includes subtracting one or more second signals sensed at one or more second electrodes of the plurality of electrodes from a sum of the plurality of first signals, wherein the first signals and the second signals are sensed simultaneously.

10. The method of claim 9, further comprising choosing the one or more second electrodes such that a noise signal received at the one or more second electrodes is correlated to a noise signal received at the plurality of first electrodes.

11. The method of claim 9, wherein the plurality of first electrodes and the one or more second electrodes are mutually exclusive.

12. The method of claim 7, wherein a number of the stylus signal detectors is based in part on the spatial correlation of a plurality of noise signals received at the plurality of electrodes of the touch sensor panel.

13. A non-transitory computer readable storage medium having stored thereon a set of instructions for detecting an asynchronous active stylus that when executed by a processor causes the processor to:
- sense, by a plurality of sense channels, one or more active stylus signals at a plurality of electrodes of a touch sensor panel, the one or more active stylus signals generated by the asynchronous active stylus, wherein each sense channel includes an amplifier;
- generate one or more aggregated signals based on combinations of outputs of the plurality of sense channels, wherein generating the one or more aggregated signals includes summing at least two of a plurality of first signals sensed at a plurality of first electrodes of the plurality of electrodes to generate at least one aggregated signal; and
- at a stylus signal detector:
  - receive one of the aggregated signals;
  - detect one of the stylus signals based on the received aggregated signal; and
  - estimate a start time and an end time for the detected stylus signal.

14. The non-transitory computer readable storage medium of claim 13, wherein the processor is further caused to choose the plurality of first electrodes such that the detected signal strength of the stylus signal is uniform and independent of the active stylus' position on the touch sensor panel.

15. The non-transitory computer readable storage medium of claim 13, wherein generating the one or more aggregated signals further includes subtracting one or more second signals sensed at one or more second electrodes of the plurality of electrodes from a sum of the plurality of first signals, wherein the first signals and the second signals are sensed simultaneously.

16. The non-transitory computer readable storage medium of claim 15, wherein the processor is further caused to choose the one or more second electrodes such that a noise signal received at the one or more second electrodes is correlated to a noise signal received at the plurality of first electrodes.

17. The non-transitory computer readable storage medium of claim 15, wherein the plurality of first electrodes and the one or more second electrodes are mutually exclusive.

18. The non-transitory computer readable storage medium of claim 13, wherein a number of the stylus signal detectors is based in part on the spatial correlation of a plurality of noise signals received at the plurality of electrodes of the touch sensor panel.

19. The apparatus of claim 1, wherein at least one of the one or more aggregated signals meets a threshold signal level irrespective of a location of the active stylus contacting the touch sensor panel, wherein the threshold signal level is sufficient to meet a signal-to-noise requirement for at least one of the stylus signal detectors.

20. The method of claim 7, wherein at least one of the one or more aggregated signals meets a threshold signal level irrespective of a location of the active stylus contacting the touch sensor panel, wherein the threshold signal level is sufficient to meet a signal-to-noise requirement for the stylus signal detector.

21. The non-transitory computer readable storage medium of claim 13, wherein at least one of the one or more aggregated signals meets a threshold signal level irrespective of a location of the active stylus contacting the touch sensor panel, wherein the threshold signal level is sufficient to meet a signal-to-noise requirement for the stylus signal detector.

22. The apparatus of claim 1, wherein the start time and the end time for the detected stylus signal are estimated based on a peak detection of the detected stylus signal.

23. The method of claim 7, wherein the start time and the end time for the detected stylus signal are estimated based on a peak detection of the detected stylus signal.

24. The non-transitory computer readable storage medium of claim 13, wherein the start time and the end time for the detected stylus signal are estimated based on a peak detection of the detected stylus signal.

* * * * *